United States Patent
Wang et al.

(10) Patent No.: US 11,317,464 B2
(45) Date of Patent: Apr. 26, 2022

(54) CELL STATE MANAGEMENT METHOD AND APPARATUS, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Shukun Wang, Dongguan (CN); Weijie Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/394,999

(22) Filed: Aug. 5, 2021

(65) Prior Publication Data

US 2021/0368577 A1    Nov. 25, 2021

Related U.S. Application Data

(63) Continuation of application No. PCT/CN2019/115395, filed on Nov. 4, 2019.

(51) Int. Cl.
*H04W 76/27* (2018.01)

(52) U.S. Cl.
CPC .................. *H04W 76/27* (2018.02)

(58) Field of Classification Search
CPC .................................................... H04W 76/27
See application file for complete search history.

(56) References Cited

U.S. PATENT DOCUMENTS

| | | | |
|---|---|---|---|
| 2008/0186893 A1* | 8/2008 | Kolding | H04W 52/0235 370/311 |
| 2015/0327156 A1 | 11/2015 | Ramkumar et al. | |
| 2019/0104543 A1* | 4/2019 | Park | H04W 72/0453 |
| 2019/0124558 A1* | 4/2019 | Ang | H04W 72/042 |
| 2020/0236692 A1* | 7/2020 | Lin | H04W 72/042 |

FOREIGN PATENT DOCUMENTS

| | | |
|---|---|---|
| CN | 103338500 A | 10/2013 |
| CN | 110012556 A | 7/2019 |
| EP | 3857808 A1 | 8/2021 |
| EP | 3923622 A1 | 12/2021 |

(Continued)

OTHER PUBLICATIONS

International Search Report issued in corresponding International Application No. PCT/CN2019/115395, dated Aug. 3, 2020, 29 pages.

(Continued)

*Primary Examiner* — Mohammad S Anwar
(74) *Attorney, Agent, or Firm* — Bayes PLLC

(57) ABSTRACT

The embodiments of the present disclosure provide a cell state management method and an apparatus, a terminal device, and a network device. The method includes receiving, by a terminal device, first configuration information sent by a network device, where the first configuration information is used to indicate whether a state of a first cell is a first state or a second state, the first state represents an active state with a dormancy behavior, and the second state represents an active state with a non-dormancy behavior.

18 Claims, 4 Drawing Sheets

(56) References Cited

FOREIGN PATENT DOCUMENTS

EP  3930377 A1  12/2021

OTHER PUBLICATIONS

PCT Written Opinion of the International Searching Authority issued in corresponding International Application No. PCT/CN2019/115395, dated Aug. 3, 2020, 8 pages.
"3rd Generation Partnership Project; Technical Specification Group Radio Access Network; NR; NR and NG-RAN Overall Description; Stage 2 (Release 16)", 3GPP TS 38.300 V16.3.0 (Sep. 2020), 148 pages.
"3rd Generation Partnership Project; Technical Specification Group Radio Access Network; NR; Medium Access Control (MAC) protocol specification (Release 16)", 3GPP TS 38.321 V16.2.1 (Sep. 2020), 153 pages.
"Discussion on fast SCell activation based on RAN1 / RAN4 reply LS", Agenda item: 6.10.4.2, Source: Qualcomm Incorporated, Verizon, Vodafone, Sprint, MediaTek Inc., Charter Communications, 3GPP TSG RAN WG2 Meeting #107b R2-1912195, Chongqing, China, Sep. 14-18, 2019 Revision based on R2-1905542, 15 pages.
3rd Generation Partnership Project; Technical Specification Group Radio Access Network; NR; Radio Resource Control (RRC) protocol specification (Release 16), 3GPP TS 38.331 V16.2.0 (Sep. 2020), 916 pages.
Extended European Search issued in corresponding European Application No. 19951253.4, dated Feb. 4, 2022, 15 pages.
"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.7.0 (Sep. 2019), 134 pages.
"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.7.0 (Sep. 2019), 959 pages.

* cited by examiner

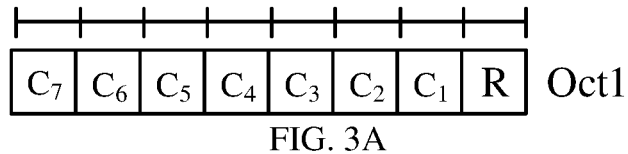

FIG. 3A

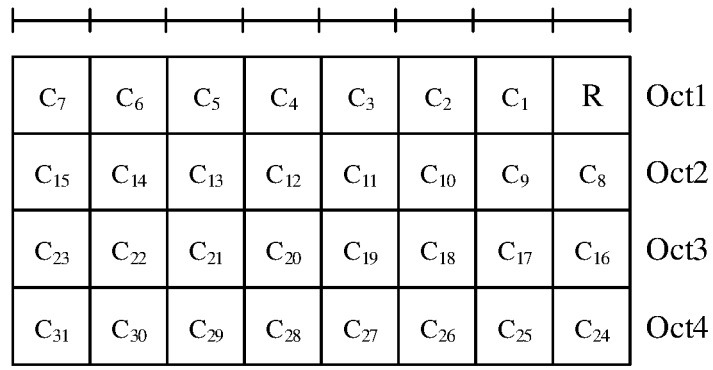

FIG. 3B

A terminal device receives first configuration information sent by a network device, the first configuration information being used to indicate whether a state of a first cell is a first state or a second state, wherein the first state represents an active state with a dormancy behavior, and the second state represents an active state with a non-dormancy behavior 401

FIG. 4

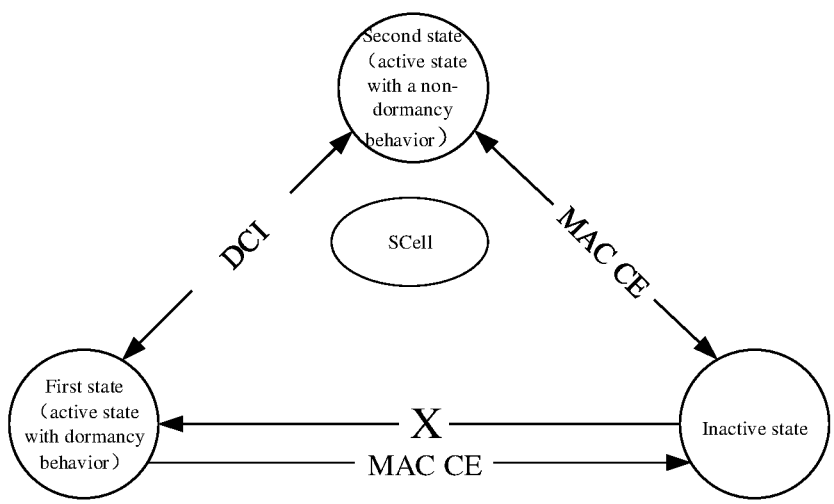

FIG. 5

CELL STATE MANAGEMENT METHOD AND APPARATUS, TERMINAL DEVICE, AND NETWORK DEVICE

CROSS REFERENCE TO RELATED APPLICATION

This application is a continuation of International Application No. PCT/CN2019/115395, filed on Nov. 4, 2019, the entire contents of which are incorporated herein by reference.

BACKGROUND

The embodiments of the present disclosure relate to the field of mobile communication technology, and specifically to a cell state management method and apparatus, a terminal device, and a network device.

In Long Term Evolution (LTE), states of a Secondary Cell (Scell) include an active state and an inactive state. In order to quickly realize cell recovery, a new cell state is defined, known as a dormant state. In the dormant state, the terminal measures and reports Channel Quality Indication (CQI)/Radio Resource Management (RRM), but does not decode a Physical Downlink Control Channel (PDCCH).

Currently, the dormant state of the Scell is not defined in New Radio (NR). In order to achieve rapid recovery of the Scell, a mechanism similar to the dormant state in LTE needs to be introduced in NR. However, the mechanism of the dormant state in LTE is more complicated and has a long time delay.

SUMMARY

The embodiments of the present disclosure provide a cell state management method and apparatus, a terminal device, and a network device.

A cell state management method provided by an embodiment of the present disclosure includes receiving, by a terminal device, first configuration information sent by a network device, the first configuration information being used to indicate whether a state of a first cell is a first state or a second state, wherein the first state represents an active state with a dormancy behavior, and the second state represents an active state with a non-dormancy behavior.

A cell state management method provided by an embodiment of the present disclosure includes sending, by a network device, first configuration information to a terminal device, the first configuration information being used to indicate whether a state of a first cell is a first state or a second state, wherein the first state represents an active state with a dormancy behavior, and the second state represents an active state with a non-dormancy behavior.

A cell state management apparatus provided by an embodiment of the present disclosure is applied to a terminal device, and the apparatus includes a receiving unit configured to receive first configuration information sent by a network device, the first configuration information being used to indicate whether a state of a first cell is a first state or a second state, wherein the first state represents an active state with a dormancy behavior, and the second state represents an active state with a non-dormancy behavior.

A cell state management apparatus provided by an embodiment of the present disclosure is applied to a network device, and the apparatus includes a sending unit configured to send first configuration information to a terminal device, the first configuration information being used to indicate whether a state of a first cell is a first state or a second state, wherein the first state represents an active state with a dormancy behavior, and the second state represents an active state with a non-dormancy behavior.

A terminal device provided by an embodiment of the present disclosure includes a processor and a memory. The memory is used for storing a computer program, and the processor is configured to call and run the computer program stored in the memory to perform the cell state management method as described above.

A network device provided by an embodiment of the present disclosure includes a processor and a memory. The memory is used for storing a computer program, and the processor is configured to call and run the computer program stored in the memory to perform the cell state management method as described above.

A chip provided by an embodiment of the present disclosure is used to implement the cell state management method as described above.

Specifically, the chip includes a processor, configured to call and run a computer program from a memory to cause a device installed with the chip to perform the cell state management method as described above.

A computer-readable storage medium provided by an embodiment of the present disclosure is used to store a computer program that causes a computer to perform the cell state management method as described above.

A computer program product provided by an embodiment of the present disclosure includes computer program instructions that cause a computer to perform the cell state management method as described above.

A computer program provided by an embodiment of the present disclosure, when running on a computer, causes the computer to perform the cell state management method as described above.

BRIEF DESCRIPTION OF THE DRAWINGS

The drawings described here are used to provide a further understanding of the disclosure and constitute a part of the disclosure. The exemplary embodiments and description of the disclosure are used to explain the disclosure, and do not constitute an improper limitation of the disclosure.

FIG. 3A is a first schematic diagram of a MAC CE according to an embodiment of the disclosure.

FIG. 3B is a second schematic diagram of a MAC CE according to an embodiment of the disclosure.

FIG. 4 is a schematic flowchart of a cell state management method according to an embodiment of the disclosure.

FIG. 5 is a schematic diagram of state transition of a Scell according to an embodiment of the disclosure.

DETAILED DESCRIPTION

The technical solutions in the embodiments of the present disclosure will be described below in connection with the drawings in the embodiments of the present disclosure. Obviously, the described embodiments are part of the embodiments of the present disclosure, but not all the embodiments. All other embodiments obtained by those of ordinary skill in the art based on the embodiments in the present disclosure without creative work fall within the protection scope of the present disclosure.

The technical solutions of the embodiments of the present disclosure can be applied to various communication systems, such as a Long Term Evolution (LTE) system, a LTE Frequency Division Duplex (FDD) system, a LTE Time Division Duplex (TDD) system, a 5G communication systems or a future communication system.

Figure 1:
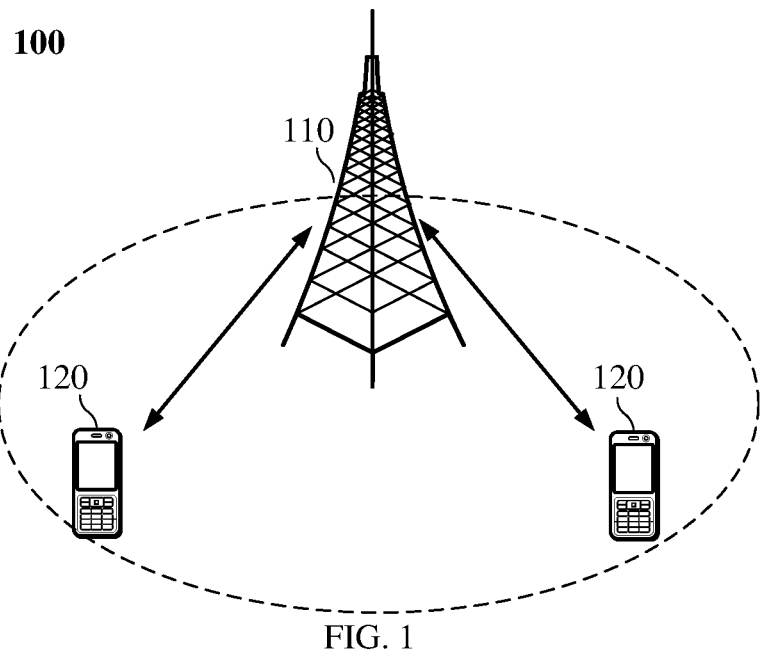
FIG. 1 is a schematic diagram of an architecture of a communication system according to an embodiment of the present disclosure.

Exemplarily, a communication system 100 in which an embodiment of the present disclosure is applied is as shown in FIG. 1. The communication system 100 can include a network device 110 which can be a device that communicates with terminals 120 (also called communication terminals or terminals). The network device 110 can provide communication coverage for a specific geographic area, and can communicate with terminals located in the coverage area. Optionally, the network device 110 can be an Evolutional Node B (eNB or eNodeB) in an LTE system, or a wireless controller in a Cloud Radio Access Network (CRAN), or the network device can be a mobile switching center, a relay station, an access point, an in-vehicle device, a wearable device, a hub, a switch, a bridge, a router, a network side device in a 5G network, a network device in a future communication system, or the like.

The communication system 100 also includes at least one terminal 120 located within the coverage range of the network device 110. As used herein, the terminal includes, but is not limited to, a device configured to receive/send communication signals and/or an Internet of Things (IoT) device, which may be connected with another device via wired lines, such as Public Switched Telephone Networks (PSTN), Digital Subscriber Line (DSL), digital cables, and direct cable connections; and/or via another data connection/network; and/or via a wireless interface, such as cellular networks, wireless local area networks (WLAN), digital TV networks such as DVB-H networks, satellite networks, AM-FM broadcast transmitter. A terminal configured to communicate through a wireless interface may be referred to as a "wireless communication terminal", a "wireless terminal" or a "mobile terminal". Examples of the mobile terminal include but are not limited to satellite or cellular phones; Personal Communications System (PCS) terminals that can combine cellular radio phones with data processing, fax, and data communication capabilities; PDAs that may include radio phones, pagers, Internet/intranet access, Web browser, memo pad, calendar, and/or Global Positioning System (GPS) receiver; and conventional laptop and/or palmtop receivers or other electronic devices including radio telephone transceivers. The terminal device may refer to access terminals, user equipment (UE), user units, user stations, mobile stations, mobile sites, remote stations, remote terminals, mobile equipment, user terminals, terminals, wireless communication equipment, user agents, or user device. The access terminal may be a cellular phone, a cordless phone, a Session Initiation Protocol (SIP) phone, a wireless local loop (WLL) station, a personal digital assistant (PDA), and wireless communication functional handheld devices, computing devices or other processing devices connected to wireless modems, in-vehicle devices, wearable devices, terminals in 5G networks, terminals in the future evolution of PLMN, or the like.

Optionally, Device to Device (D2D) communication can be performed between the terminals 120.

Optionally, the 5G system or 5G network may also be referred to as a New Radio (NR) system or NR network.

FIG. 1 exemplarily shows one network device and two terminals. Optionally, the communication system 100 may include multiple network devices and other number of terminals can be included in the coverage of each network device, which is not particularly limited in the embodiments of the present disclosure.

Optionally, the communication system 100 may also include other network entities such as a network controller and a mobility management entity, which are not limited in the embodiments of the present disclosure.

It should be understood that the device with a communication function in the network and/or system of the embodiments of the present disclosure may be referred to as the communication device. Taking the communication system 100 shown in FIG. 1 as an example, the communication device may include a network device 110 and terminals 120 which have the communication function. The network device 110 and the terminals 120 may be the specific devices as described above, which will not be repeated here. The communication device may also include other devices in the communication system 100, such as a network controller, a mobility management entity, and other network entities, which are not limited in the embodiments of the present disclosure.

It should be understood that the terms "system" and "network" are often used interchangeably herein. The term "and/or" used herein is merely to describe relative relationships of relative objects, indicating that there can be three kinds of relationships. For example, A and/or B can indicate three cases where A exists alone, A and B exist simultaneously, or B exists alone. In addition, the character "I" used herein generally indicates that the related objects before and after this character are in an "or" relationship.

In order to facilitate understanding of the technical solutions of the embodiments of the present disclosure, related technologies involved in the embodiments of the present disclosure are described below.

With pursuit of speed, latency, high-speed mobility and energy efficiency, and with the diversity and complexity of services in future life, the 3rd Generation Partnership Project (3GPP) international standards organization has begun to develop 5G. The main application scenarios of 5G include enhanced Mobile Broadband (eMBB), Ultra-Reliable Low-Latency Communications (URLLC), and massive Machine-Type Communications (mMTC).

On the one hand, eMBB is still targeting at obtaining multimedia content, services and data by the users, and the demand therefor is growing very rapidly. On the other hand, since eMBB may be deployed in different scenarios, such as indoors, urban areas, rural areas, etc., the capabilities and requirements thereof are also quite different, and they cannot be generalized and must be analyzed in detail in conjunction with specific deployment scenarios. Typical applications of URLLC include industrial automation, power automation, telemedicine operations (surgeries), traffic safety protection, etc. Typical features of mMTC include high connection density, small data volume, delay insensitive services, low cost and long service life of the module, etc.

In the early deployment of NR, it difficult to obtain complete NR coverage, and thus the typical network coverage is wide-area LTE coverage and NR island coverage pattern. Moreover, the LTE is largely deployed below 6 GHz, and there is very little spectrum below 6 GHz that can be used for 5G. Therefore, the application of spectrum above 6 GHz must be studied for NR, but the high frequency band has limited coverage and fast signal fading. At the same time, in order to protect mobile operators' early investment in LTE, an operation mode of tight interworking between LTE and NR is proposed.

Figure 2A:
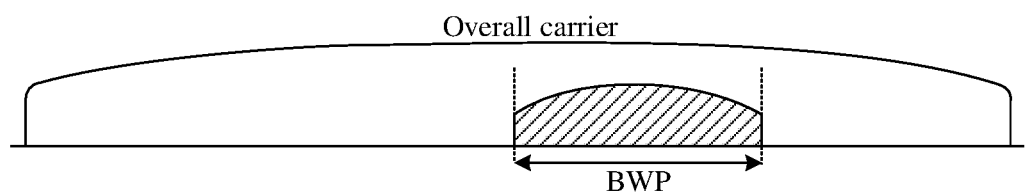
FIG. 2A is a first schematic diagram of a BWP according to an embodiment of the disclosure.
Figure 2B:
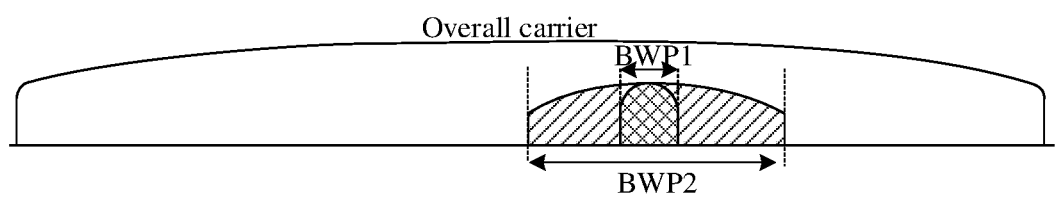
FIG. 2B is a second schematic diagram of a BWP according to an embodiment of the disclosure.
Figure 2C:
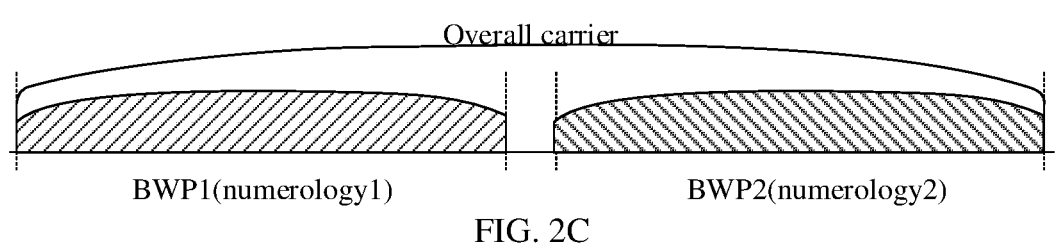
FIG. 2C is a third schematic diagram of a BWP according to an embodiment of the disclosure.

In 5G, a maximum channel bandwidth can be 400 MHZ, known as a wideband carrier. Compared with the maximum bandwidth of 20M in LTE, the bandwidth of the wideband carrier is very large. If the terminal device keeps working on the wideband carrier, the power consumption of the terminal device is very large. Therefore, it is recommended that a radio frequency (RF) bandwidth of the terminal device can be adjusted according to an actual throughput of the terminal device. As such, the concept of BWP is introduced, the motivation of which is to optimize the power consumption of terminal device. For example, if a rate of the terminal device is low, the terminal device can be configured with a smaller BWP (as shown in FIG. 2A), and if the rate requirement of the terminal device is high, the terminal device can be configured with a larger BWP (as shown in FIG. 2B). If the terminal device supports a high rate or works in a Carrier Aggregation (CA) mode, the terminal device can be configured with a plurality of BWPs (as shown in FIG. 2C). Another purpose of BWP is to trigger coexistence of multiple numerologies in a cell. As shown in FIG. 2C, BWP1 corresponds to numerology 1, and BWP2 corresponds to numerology 2.

Through Radio Resource Control (RRC) dedicated signaling, a terminal can be configured with a maximum of 4 uplink BWPs and a maximum of 4 downlink BWPs, but only one uplink BWP and downlink BWP can be activated at the same time. A first activated BWP among the configured BWPs can be indicated in the RRC dedicated signaling. At the same time, while the terminal is in a connected state, switching between different BWPs can also be performed through Downlink Control Information (DCI). When the carrier in the inactive state enters the active state, the BWP that is activated first is the first activated BWP configured in the RRC dedicated signaling. The configuration parameters of each BWP include subcarrierSpacing; cyclicPrefix; a first Physical Resource Block (PRB) of the BWP and a number of continuous PRBs (locationAndBandwidth); BWP identification (BWP-ID); and BWP common configuration parameters and dedicated configuration parameters (BWP-Common, BWP-Dedicated).

When performing Radio Link Monitor (RLM), the terminal performs the RLM only on the active BWP, and it needs not to operate on the inactive BWPs. When switching between different BWPs, there is no need to reset the RLM Related timer and counter. For RRM measurement, no matter on which active BWP the terminal sends and receives data, it does not affect the RRM measurement. Also, the terminal only needs to perform CQI measurement on the active BWP.

When a carrier is deactivated and then is activated through a Media Access Control Control Element (MAC CE), an initial BWP that is activated first is the first activated BWP configured in the RRC dedicated signaling.

A value of the BWP ID in the RRC dedicated signaling ranges from 0 to 4, and the BWP with a BWP ID of 0 is the initial BWP by default.

A BWP indicator in DCI includes 2 bits, as shown in Table 1 below. If the number of configured BWPs is less than or equal to 3, the BWP indicator=1, 2, 3 correspond to BWP ID=1, 2, 3, respectively. If the number of the BWPs is 4, the BWP indicator=0, 1, 2, 3 correspond to the BWPs configured in an index order, respectively. And the network side uses continuous BWP IDs when configuring the BWPs.

TABLE 1

| Value of BWP indicator (2 bits) | BWP |
| --- | --- |
| 00 | First BWP configured by higher layers |
| 01 | Second BWP configured by higher layers |
| 10 | Third BWP configured by higher layers |
| 11 | Fourth BWP configured by higher layers |

In order to meet high-speed requirements, CA technology is also supported in 5G. CA enables the NR system to support a larger bandwidth by jointly scheduling and using resources on multiple Component Carriers (CCs), thereby enabling a higher system peak rate. According to continuity of the aggregated carriers on the spectrum, there can be continuous carrier aggregation and non-continuous carrier aggregation; and according to whether the bands where the aggregated carriers are located are the same, there can be intra-band carrier aggregation and inter-band carrier aggregation.

In the CA, there is one and only one Primary Cell Component (PCC), and the PCC provides RRC signaling connection, non-access stratum (NAS) function, security function, etc. The Physical Uplink Control Channel (PUCCH) exists on the PCC and only on the PCC. A Secondary Cell Component (SCC) only provides additional radio resources. The PCC and the SCC are collectively known as serving cells, where the cell on the PCC is a Primary cell (Pcell), and the cell on the SCC is the Scell. The standard also specifies that the aggregated carriers support a maximum of 5 carries, that is, the maximum bandwidth after aggregation is 100 MHZ, and the aggregated carriers belong to the same base station. All aggregated carriers use the same Cell-Radio Network Temporary Identifier (C-RNTI), and the base station ensures that the C-RNTI does not conflict in the cells where each of the carriers is located. Since both asymmetric carrier aggregation and symmetric carrier aggregation are supported, it is required that the aggregated carriers must have downlink but may not have uplink. And for the PCC cell, there must be the PDCCH and PUCCH of the current cell, and only the primary carrier cell has the PUCCH, and other secondary carrier cells may have the PDCCH.

The Scell is configured through RRC dedicated signaling, and the initial configured state is an inactive state in which data transmission and reception cannot be performed. Then, the data transmission and reception can only be performed if the Scell is activated through the MAC CE. From the perspective of Scell configuration and activation delay, such architecture is not an optimal architecture. And such delay reduces the efficiency of CA usage and radio resources, especially in small cell deployment scenarios. In a dense small cell deployment scenario, the signaling load of each Scell is also very large, especially when each Scell needs to be configured separately. Therefore, the current CA architecture introduces additional delay, which restricts the use of CA and reduces the gain of CA load sharing.

To this end, LTE R15 optimizes the CA, and the functions that are mainly optimized are as follows. 1) The states of the Scell include the active state and the inactive state, and in order to realize fast cell recovery, a new cell state is defined, i.e., a dormant state. In the dormant state, the terminal measures and reports CQI/RRM, but does not decode PDCCH. At the same time, a new MAC CE is defined to control the transition between the active state and the dormant state, as shown in FIG. 3A and FIG. 3B. In FIG. 3A, the MAC CE includes 1 byte and controls the state transition of 7 cells, and in FIG. 3B, the MAC CE includes 4 bytes and controls the state transition of 31 cells, where Ci represents the state corresponding to the cell with an index number of i, and Ci being set to 1 indicates that the cell with the index number of i is in the dormant state, and Ci being set to 0 indicates that the cell with the index number of i is in the active state. 2) In the RRC signaling, the state of Scell can be configured to be the active state or the dormant state, and is in the inactive state by default.

Currently, there is no dormant state of the Scell in NR. In order to realize rapid recovery of the Scell and transmit data as soon as possible, a mechanism similar to the dormant state needs to be introduced. However, the mechanism of the dormant state in LTE is too complicated and the MAC CE needs to be introduced to perform the state transition of the Scell. To this end, it is considerable to configure a concept called a dormant BWP for Scell. When the traffic is not large, the BWPs of some of the Scells can be switched to the dormant BWPs through the DCI method. When the traffic is large, the dormant BWP of the Scell is switched to the non-dormant BWP through the DCI to activate the service transmission function of the cell, which has a shorter activation delay and lower complexity compared with the traditional dormant state of the Scell.

In NR, the state of the Scell is directly configured to be the active state through the RRC, where the active state has a dormancy behavior and a non-dormancy behavior, that is, the dormancy behavior is a part of the active state. In configuring the Scell state to be the active state through the RRC, there is an issue that needs to be clarified, that is, it needs to be determined whether the state of the Scell is the activated Scell state with the dormancy behavior or the activated Scell state with the non-dormancy behavior. In addition, the terminal device can stay on the dormant BWP to implement the dormancy behavior, and there is an issue that needs to be clarified, that is, it needs to be determined on which BWP the terminal device stays to send/receive data after switching from the active state with the dormancy behavior to the active state with the non-dormancy behavior. To this end, the following technical solutions are proposed according to the embodiments of the present disclosure.

FIG. 4 is a schematic flowchart of a cell state management method provided by an embodiment of the present disclosure. As shown in FIG. 4, the cell state management method includes the following steps.

At step 401, a terminal device receives first configuration information sent by a network device, the first configuration information being used to indicate whether a state of a first cell is a first state or a second state, wherein the first state represents an active state with a dormancy behavior, and the second state represents an active state with a non-dormancy behavior.

In an embodiment of the present disclosure, the network device sends the first configuration information to the terminal device, and accordingly, the terminal device receives the first configuration information sent by the network device. Further, optionally, the network device may be a base station, such as a gNB.

In an optional implementation of the present disclosure, the first configuration information is carried in RRC signaling.

In an optional implementation of the present disclosure, the first configuration information includes uplink BWP configuration information and downlink BWP configuration information, the uplink BWP configuration information includes at least one uplink BWP configuration, and the downlink BWP configuration information includes at least one downlink BWP configuration.

The uplink BWP configuration information carries first indication information, and the first indication information is used to indicate a BWP identification corresponding to an uplink initial activated BWP; the downlink BWP configuration information carries second indication information, and the second indication information is used to indicate the BWP identification corresponding to a downlink initial activated BWP; and the initial activated BWP represents a BWP that is first activated.

In the above solution, the uplink BWP configuration information includes a number of N1 uplink BWP configurations, where N1 is a positive integer, and further, N1 is an integer greater than or equal to 1 and less than or equal to 4. The downlink BWP configuration information includes a number of N2 downlink BWP configurations, where N2 is a positive integer, and further, N2 is an integer greater than or equal to 1 and less than or equal to 4.

It should be noted that the uplink BWP and the downlink BWP are independently configured. In an embodiment of the present disclosure, the network device separately indicates the initial activated BWP in the uplink BWP configuration information and the downlink BWP configuration information, where the initial activated BWP refers to the BWP that is first activated. For the uplink BWP configuration information, the network device indicates the BWP identification corresponding to the uplink initial activated BWP by carrying the first indication information in the uplink BWP configuration information. For the downlink BWP configuration information, the network device indicates the BWP identification corresponding to the downlink initial activated BWP by carrying the first indication information in the downlink BWP configuration information.

Further, optionally, the uplink BWP configuration information further carries third indication information, and/or the downlink BWP configuration information carries fourth indication information, the third indication information is used to indicate the BWP identification corresponding to an uplink dormant BWP, and the fourth indication information is used to indicate the BWP identification corresponding to a downlink dormant BWP.

In an optional implementation of the present disclosure, the first cell is a Scell, and the active state of the Scell may also be referred to as an activated SCell state. The dormancy behavior (corresponding to the first state) or non-dormancy behavior (corresponding to the second state) of the activated SCell state is configured through the RRC signaling.

Specifically, there are two active states for the Scell, i.e., the first state and the second state, where the first state refers to an activated state with a dormancy behavior, i.e., an activated dormancy state, and the second state refers to an activated state with a non-dormancy behavior, i.e., an activated non-dormancy state.

In an embodiment of the present disclosure, the configuration of the first state and the second state may be specifically implemented in any of the following ways.

1) The first configuration information carries fifth indication information, and the fifth indication information is used to indicate that the state of the first cell is the first state or the second state.

Specifically, the state of the SCell is configured to be the first state (i.e., the activated dormancy state) or the second state (i.e., the activated non-dormancy state) through the RRC signaling, as shown in Table 2-1 below, where sCell-State represents the fifth indication information.

TABLE 2-1

```
SCellConfig : : =                SEQUENCE {
  sCellIndex                     SCellIndex,
  sCellConfigCommon              ServingCellConfigCommon
  OPTIONAL, -- Cond SCellAdd
  sCellConfigDedicated           ServingCellConfig
  OPTIONAL, -- Cond SCellAddMod
  ...,
  [[
    smtc                         SSB-MTC
  OPTIONAL -- Need S
  ]],
  [[
    sCellState-r16               ENUMERATED {activatedDormancy, activatedNonDormancy}
  OPTIONAL -- Need S
    [[
}
```

Further, if the state of the first cell is the first state (that is, the state of the Scell configured by RRC signaling is the activated dormancy state), after receiving the first configuration information (that is, the RRC signaling), the terminal device ignores the first indication information and/or the second indication information, and remains to stay on the dormant BWP. Here, the first indication information indicates the BWP identification corresponding to the uplink initial activated BWP (i.e., firstActiveDownlinkBWP-Id), and the second indication information indicates the BWP identification corresponding to the downlink initial activated BWP (i.e., firstActiveUplinkBWP-Id).

Here, it should be noted that the BWP identification indicated by the first indication information and/or the second indication information is different from the BWP identification of the dormant BWP. That is, "firstActiveDownlinkBWP-Id" and/or "firstActiveUplinkBWP-Id" cannot be set to the BWP identification corresponding to the dormant BWP.

2) The first configuration information carries fifth indication information and sixth indication information, the fifth indication information is used to indicate that the state of the first cell is the active state, and the sixth indication information is used to indicate that a type of the active state is dormancy or non-dormancy; wherein the type of the activation state being the dormancy indicates that the state of the first cell is the first state, and the type of the activation state being the non-dormancy indicates the state of the first cell is the second state.

Specifically, the state of the SCell is configured as the active state through the RRC signaling, and it also indicates whether the type of the active state of the Scell is dormancy (corresponding to the first state) or non-dormancy (corresponding to the second state), as shown in Table 2-2 below, where SCellState represents the fifth indication information, and sCellStateType represents the sixth indication information.

TABLE 2-2

```
SCellConfig : : =                SEQUENCE
  sCellIndex                     SCellIndex,
  sCellConfigCommon              ServingCellConfigCommon
  OPTIONAL, -- Cond SCellAdd
  sCellConfigDedicated           ServingCellConfig
  OPTIONAL, -- Cond SCellAddMod
  ...,
  [[
    smtc                         SSB-MTC
  OPTIONAL -- Need S
  ]],
  [[
    sCellState-r16               ENUMERATED {activated}
  OPTIONAL -- Need S
  ]],
    [ [sCellStateType-R16        ENUMERATED {dormancy,nonDormancy}
  OPTIONAL -- Need S] ]
}
```

Further, if the state of the first cell is the first state (that is, the state of the Scell configured by RRC signaling is the activated dormancy state), after receiving the first configuration information (that is, the RRC signaling), the terminal device ignores the first indication information and/or the second indication information, and remains to stay on the dormant BWP. Here, the first indication information indicates the BWP identification corresponding to the uplink initial activated BWP (i.e., firstActiveDownlinkBWP-Id), and the second indication information indicates the BWP identification corresponding to the downlink initial activated BWP (i.e., firstActiveUplinkBWP-Id).

Here, it should be noted that the BWP identification indicated by the first indication information and/or the second indication information is different from the BWP identification of the dormant BWP. That is, "firstActiveDownlinkBWP-Id" and/or "firstActiveUplinkBWP-Id" cannot be set to the BWP identification corresponding to the dormant BWP.

3) The first configuration information carries fifth indication information, and the fifth indication information is used to indicate that the state of the first cell is the active state; if the BWP identification indicated by the first indication information and/or the second indication information is the same as the BWP identification of the dormant BWP, an initial state of the first cell is the first state; and if the BWP identification indicated by the first indication information and/or the second indication information is different from the BWP identification of the dormant BWP, the initial state of the first cell is the second state.

Specifically, through RRC signaling, the state of ScellState is set to the active state, and "firstActiveDownlinkBWP-Id" and/or "firstActiveUplinkBWP-Id" is set to the BWP identification corresponding to the dormant BWP, indicating that the initial SCell state is the activated dormancy state; otherwise, the initial SCell state is the activated non-dormancy state.

In an embodiment of the present disclosure, in order to ensure valid measurement results of the CQI and BM, there are the following configuration constraints on the dormant BWP.

A bandwidth of the dormant BWP is included in a first BWP indicated by the first configuration information; or the bandwidth of the dormant BWP partially overlaps the bandwidth of the first BWP indicated by the first configuration information.

Further, optionally, the first BWP is an uplink initial activated BWP and/or a downlink initial activated BWP; or the first BWP is a (arbitrary) non-dormant BWP.

Further, optionally, the dormant BWP is not assigned a corresponding BWP identification, so that the use of the BWP identification can be saved. Alternatively, the dormant BWP is assigned a corresponding BWP identification, and the BWP identification is greater than or equal to N, where N is a positive integer, for example N=5.

Further, optionally, the dormant BWP is configured at a cell granularity; and the configuration of the dormant BWP is carried in a system broadcast message of the first cell.

In an embodiment of the present disclosure, the network side can control the BWP state transition through DCI, which will be described in detail below.

The network device sends first control signaling to the terminal device, and after receiving the first control signaling sent by the network device, the terminal device switches from the current BWP to a first BWP, where the first control signaling is used to instruct the terminal device to enter the second state from the first state.

Here, the first control signaling is layer 1 (L1) signaling, such as DCI. Specifically, when the network side instructs the terminal device to enter the second state (i.e., the activated non-dormancy state) from the first state (i.e., the activated dormancy state) of the first cell through DCI, the terminal device autonomously switches to the first BWP configured by the RRC signaling.

Here, the first BWP may be any of the following. 1) The first BWP is the uplink initial activated BWP (i.e., firstActiveDownlinkBWP) and/or the downlink initial activated BWP (i.e., firstActiveUplinkBWP) that is configured in the first configuration information. 2) The first BWP is an uplink BWP and/or a downlink BWP that last serves before the terminal device enters the first state. 3) The first BWP is a BWP after the terminal device enters the second state that is indicated in the first control signaling (such as DCI).

It should be noted that as for 3), the network side needs to explicitly indicate the activated BWP after the terminal device enters the activated non-dormancy state through DCI.

In an embodiment of the present disclosure, the network side can control the Scell state transition through the MAC CE, which will be described in detail below.

(1) The network device sends second control signaling to the terminal device, and after receiving the second control signaling sent by the network device, the terminal device enters the inactive state from the first state or the second state; wherein the second control signaling is used to instruct the terminal device to enter the inactive state from the active state, to enter the inactive state from the first state, or to enter the inactive state from the second state.

Further, optionally, the second control signaling is a MAC CE.

Specifically, referring to FIG. 5, when a terminal device receives a MAC CE used for indicating SCell activation/deactivation (i.e., a SCell Activation/Deactivation MAC CE), as for the SCell that is indicated to enter the inactive state from the active state, the terminal device considers that it enters the inactive state regardless of whether the activated dormancy state or activated non-dormancy state is indicated. It should be noted that the inactive state in the embodiments of the present disclosure may also be referred to as a deactivated state.

(2.1) The network device sends third control signaling to the terminal device, and the terminal device enters the second state from the inactive state after receiving the third control signaling sent by the network device, where the third control signaling is used to instruct the terminal device to enter the active state from the inactive state or to enter the second state from the inactive state.

Further, optionally, the third control signaling is a MAC CE.

Specifically, referring to FIG. 5, as for the Scell that is from the inactive state to the active state, the terminal device considers that the Scell will always enters the activated non-dormancy state (that is, the second state).

(2.2) The network device sends the third control signaling to the terminal device, and after receiving the third control signaling sent by the network device, the terminal device enters a target state from the inactive state, and the target state is determined based on seventh indication information in the first configuration information, where the seventh indication information is used to indicate that an initial state when the first cell enters the active state is the first state or the second state; where the third control signaling is used to instruct the terminal device to enter the active state from the inactive state, to enter the first state from the inactive state, or to enter the second state from the inactive state.

Further, optionally, the third control signaling is a MAC CE.

Specifically, referring to FIG. 5, whether the initial behavior of the Scell entering the active state is dormancy or non-dormancy (that is, whether the initial state of the Scell entering the active state is the first state or the second state) is configured through the RRC signaling. When the terminal device enters the active state from the inactive state, it enters the activated dormancy state or activated non-dormancy state that is configured by the RRC signaling.

In an embodiment of the present disclosure, there are the following configuration constraints on the dormant behavior.

(A) For a PCell, it cannot be configured to be in or enter the first state (i.e., the activated dormancy state or the active state with the dormant behavior).

Here, the PCell refers to a primary cell in a main cell group (MCG).

(B) For a PScell, if the first cell is a PScell in a SCG, the first cell cannot be configured to be in or enter the first state; or the first cell determines whether it can be configured to be in or enter the first state based on eighth indication information in the first configuration information; or when the SCG is in the first state, the first cell can be configured to be in or enter the first state.

Here, the PScell refers to a primary cell in a secondary cell group (SCG).

(C) For a PUCCH Scell, that is, if the first cell is a PUCCH Scell in a first cell group, the first cell cannot be configured to be in or enter the first state; or the first cell determines whether it can be configured to be in or enter the first state based on eighth indication information in the first configuration information; or when all Scells in the first cell group are in the first state, the first cell can be configured to be in or enter the first state.

Here, the first cell group may also be referred to as a PUCCH group, and uplink control information (such as feedback information) of all Scells included in the PUCCH group is transmitted through a PUCCH Scell, where the PUCCH Scell is one of the Scells in the PUCCH group.

Figure 6:
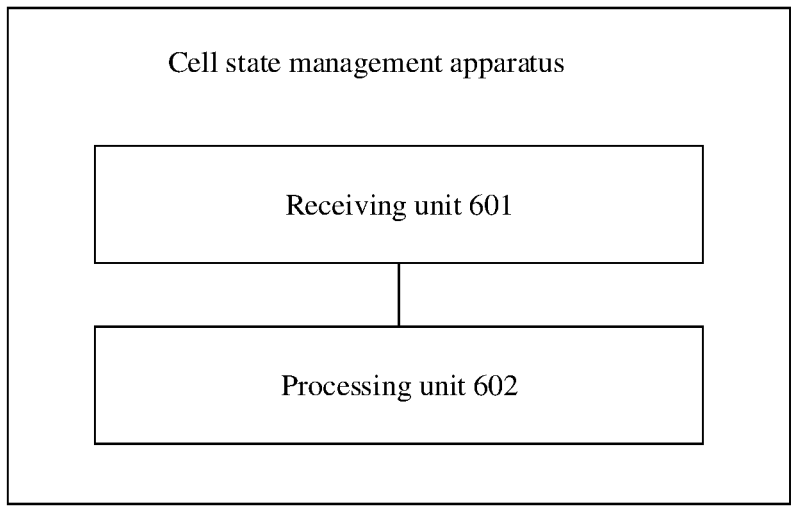
FIG. 6 is a first schematic diagram of structural composition of a cell state management apparatus according to an embodiment of the disclosure.

FIG. 6 is a first schematic diagram of structural composition of a cell state management device apparatus provided by an embodiment of the disclosure, which is applied to a terminal device. As shown in FIG. 6, the cell state management apparatus includes a receiving unit 601 configured to receive first configuration information sent by a network device, the first configuration information being used to indicate whether a state of a first cell is a first state or a second state, where the first state represents an active state with a dormancy behavior, and the second state represents an active state with a non-dormancy behavior.

In an optional implementation, the first configuration information includes uplink BWP configuration information and downlink BWP configuration information, the uplink BWP configuration information includes at least one uplink BWP configuration, and the downlink BWP configuration information includes at least one downlink BWP configuration.

The uplink BWP configuration information carries first indication information, and the first indication information is used to indicate a BWP identification corresponding to an uplink initial activated BWP; the downlink BWP configuration information carries second indication information, and the second indication information is used to indicate the BWP identification corresponding to a downlink initial activated BWP; and the initial activated BWP represents a BWP that is first activated.

In an implementation, the uplink BWP configuration information further carries third indication information, and/or the downlink BWP configuration information carries fourth indication information, the third indication information is used to indicate the BWP identification corresponding to an uplink dormant BWP, and the fourth indication information is used to indicate the BWP identification corresponding to a downlink dormant BWP.

In an optional implementation, the first configuration information carries fifth indication information, and the fifth indication information is used to indicate that the state of the first cell is the first state or the second state.

In an optional implementation, the first configuration information carries fifth indication information and sixth indication information, the fifth indication information is used to indicate that the state of the first cell is the active state; and the sixth indication information is used to indicate a type of the active state is dormancy or non-dormancy; where the type of the active state being the dormancy indicates that the state of the first cell is the first state, and the type of the active state being the non-dormancy indicates that the state of the first cell is the second state.

In an optional implementation, if the state of the first cell is the first state, after receiving the first configuration information, the terminal device ignores the first indication information and/or the second instruction information, and remains to stay on the dormant BWP.

In an optional implementation, the BWP identification indicated by the first indication information and/or the second indication information is different from the BWP identification of the dormant BWP.

In an optional implementation, the first configuration information carries fifth indication information, and the fifth indication information is used to indicate that the state of the first cell is the active state.

If the BWP identification indicated by the first indication information and/or the second indication information is the same as the BWP identification of the dormant BWP, an initial state of the first cell is the first state; and if the BWP identification indicated by the first indication information and/or the second indication information is different from the BWP identification of the dormant BWP, the initial state of the first cell is the second state.

In an optional implementation, a bandwidth of the dormant BWP is included in a first BWP indicated in the first configuration information; or the bandwidth of the dormant BWP partially overlaps the bandwidth of the first BWP indicated in the first configuration information.

In an optional implementation, the first BWP is an uplink initial activated BWP and/or a downlink initial activated BWP; or the first BWP is a non-dormant BWP.

In an optional implementation, the dormant BWP is not assigned a corresponding BWP identification; or the dormant BWP is assigned a corresponding BWP identification, and the BWP identification is greater than or equal to N, where N is a positive integer.

In an optional implementation, the dormant BWP is configured at a cell granularity; and the configuration of the dormant BWP is carried in a system broadcast message of the first cell.

In an optional implementation, the first configuration information is carried in RRC signaling.

In an optional implementation, the receiving unit 601 is further configured to receive first control signaling sent by the network device; and the apparatus further includes a processing unit 602, configured to switch from a current BWP to a first BWP, and the first control signaling is used to instruct the terminal device to enter the second state from the first state.

In an optional implementation, the first BWP is an uplink initial activated BWP and/or a downlink initial activated BWP that is configured in the first configuration information.

In an optional implementation, the first BWP is an uplink BWP and/or a downlink BWP that last serves before the terminal device enters the first state.

In an optional implementation, the first BWP is a BWP after the terminal device enters the second state that is indicated in the first control signaling.

In an optional implementation, the first control signaling is DCI.

In an optional implementation, the receiving unit 601 is further configured to receive second control signaling sent by the network device; and the apparatus further includes a processing unit 602, configured to enter an inactive state from the first state or the second state; where the second control signaling is used to instruct the terminal device to enter the inactive state from the active state, to enter the inactive state from the first state, or to enter the inactive state from the second state.

In an optional implementation, the second control signaling is a MAC CE.

In an optional implementation, the receiving unit 601 is further configured to receive third control signaling sent by the network device; the apparatus further includes a processing unit 602, configured to enter the second state from an inactive state; where the third control signaling is used to instruct the terminal device to enter the active state from the inactive state or to enter the second state from the inactive state.

In an optional implementation, the receiving unit 601 is further configured to receive third control signaling sent by the network device; the apparatus further includes a processing unit 602, configured to enter a target state from an inactive state, the target state is determined based on seventh indication information in the first configuration information, and the seventh indication information is used to indicate that an initial state of the terminal device when the terminal device enters the active state is the first state or the second state; and where the third control signaling is used to instruct the terminal device to enter the active state from the inactive state, to enter the first state from the inactive state, or to enter the second state from the inactive state.

In an optional implementation, the third control signaling is a MAC CE.

In an optional implementation, the first cell is a Scell.

In an optional implementation manner, if the first cell is a PScell in an SCG, the first cell cannot be configured to be in or enter the first state; or the first cell determines whether it can be configured to be in or enter the first state based on eighth indication information in the first configuration information; or when the SCG is in the first state, the first cell can be configured to be in or enter the first state.

In an optional implementation, if the first cell is a PUCCH Scell in a first cell group, the first cell cannot be configured to be in or enter the first state; or the first cell determines whether it can be configured to be in or enter the first state based on eighth indication information in the first configuration information; or when all Scells in the first cell group are in the first state, the first cell can be configured to be in or enter the first state.

Those skilled in the art should understand that the relevant description of the foregoing cell state management apparatus in the embodiments of the present disclosure can be understood with reference to the relevant description of the cell state management method in the embodiments of the present disclosure.

Figure 7:
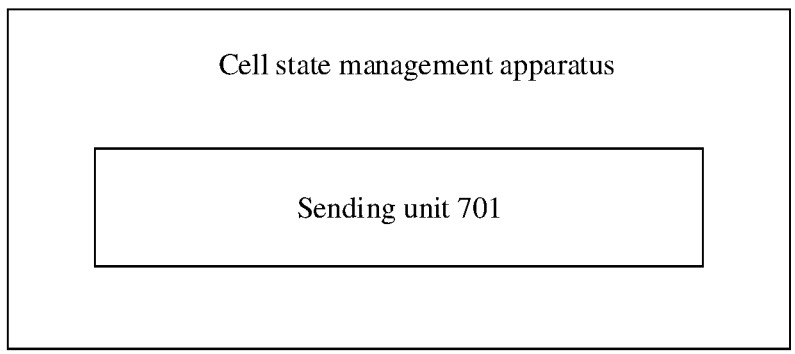
FIG. 7 is a second schematic diagram of structural composition of a cell state management apparatus according to an embodiment of the disclosure.

FIG. 7 is a second schematic diagram of structural composition of a cell state management apparatus provided by an embodiment of the disclosure, which is applied to a network device. As shown in FIG. 7, the cell state management apparatus includes a sending unit 701 configured to send first configuration information to a terminal device, the first configuration information being used to indicate whether a state of a first cell is a first state or a second state, where the first state represents an active state with a dormancy behavior, and the second state represents an active state with a non-dormancy behavior.

In an optional implementation, the first configuration information includes uplink BWP configuration information and downlink BWP configuration information, the uplink BWP configuration information includes at least one uplink BWP configuration, and the downlink BWP configuration information includes at least one downlink BWP configuration.

The uplink BWP configuration information carries first indication information, and the first indication information is used to indicate a BWP identification corresponding to an uplink initial activated BWP; the downlink BWP configuration information carries second indication information, and the second indication information is used to indicate the BWP identification corresponding to a downlink initial activated BWP; and the initial activated BWP represents a BWP that is first activated.

In an optional implementation, the uplink BWP configuration information further carries third indication information, and/or the downlink BWP configuration information carries fourth indication information, the third indication information is used to indicate the BWP identification corresponding to an uplink dormant BWP, and the fourth indication information is used to indicate the BWP identification corresponding to a downlink dormant BWP.

In an optional implementation, the first configuration information carries fifth indication information, and the fifth indication information is used to indicate that the state of the first cell is the first state or the second state.

In an optional implementation, the first configuration information carries fifth indication information and sixth indication information, the fifth indication information is used to indicate that the state of the first cell is the active state; and the sixth indication information is used to indicate that a type of the active state is dormancy or non-dormancy; where the type of the active state being the dormancy indicates that the state of the first cell is the first state, and the type of the active state being the non-dormancy indicates that the state of the first cell is the second state.

In an optional implementation, the first configuration information carries fifth indication information, and the fifth indication information is used to indicate that the state of the first cell is the active state; if a BWP identification indicated by the first indication information and/or the second indication information is the same as the BWP identification of a dormant BWP, an initial state of the first cell is the first state; and if the BWP identification indicated by the first indication information and/or the second indication information is different from the BWP identification of the dormant BWP, the initial state of the first cell is the second state.

In an optional implementation, a bandwidth of the dormant BWP is included in a first BWP indicated in the first configuration information; or the bandwidth of the dormant BWP partially overlaps the bandwidth of the first BWP indicated in the first configuration information.

In an optional implementation, the first BWP is an uplink initial activated BWP and/or a downlink initial activated BWP; or the first BWP is a non-dormant BWP.

In an optional implementation, the dormant BWP is not assigned a corresponding BWP identification; or the dormant BWP is assigned a corresponding BWP identification, and the BWP identification is greater than or equal to N, where N is a positive integer.

In an optional implementation, the dormant BWP is configured at a cell granularity; and the configuration of the dormant BWP is carried in a system broadcast message of the first cell.

In an optional implementation, the first configuration information is carried in RRC signaling.

In an optional implementation, the sending unit 701 is further configured to send first control signaling to the terminal device to trigger the terminal device to switch from the current BWP to a first BWP; where the control signaling is used to instruct the terminal device to enter the second state from the first state.

In an optional implementation, the first BWP is an uplink initial activated BWP and/or a downlink initial activated BWP configured in the first configuration information.

In an optional implementation, the first BWP is an uplink BWP and/or a downlink BWP that last serves before the terminal device enters the first state.

In an optional implementation, the first BWP is a BWP after the terminal device enters the second state that is indicated in the first control signaling.

In an optional implementation, the first control signaling is DCI.

In an optional implementation, the sending unit 701 is further configured to send second control signaling to the terminal device to trigger the terminal device to enter an inactive state from the first state or the second state. The second control signaling is used to instruct the terminal device to enter the inactive state from the active state, to enter the inactive state from the first state, or to enter the inactive state from the second state.

In an optional implementation, the second control signaling is a MAC CE.

In an optional implementation manner, the sending unit 701 is further configured to send third control signaling to the terminal device to trigger the terminal device to enter the second state from the inactive state. The third control signaling is used to instruct the terminal device to enter the active state from the inactive state or to enter the second state from the inactive state.

In an optional implementation, the sending unit 701 is further configured to send third control signaling to the terminal device to trigger the terminal device to enter a target state from the inactive state, the target state is determined based on the seventh indication information in the first configuration information, and the seventh indication information is used to indicate that an initial state of the first cell when the first cell enters the active state is the first state or the second state. The third control signaling is used to instruct the terminal device to enter the active state from the inactive state, to enter the first state from the inactive state, or to enter the second state from the inactive state.

In an optional implementation, the third control signaling is a MAC CE.

In an optional implementation, the first cell is a Scell.

In an optional implementation manner, if the first cell is a PScell in an SCG, the first cell cannot be configured to be in or enter the first state; or the first cell determines whether it can be configured to be in or enter the first state based on eighth indication information in the first configuration information; or when the SCG is in the first state, the first cell can be configured to be in or enter the first state.

In an optional implementation, if the first cell is a PUCCH Scell in a first cell group, the first cell cannot be configured to be in or enter the first state; or the first cell determines whether it can be configured to be in or enter the first state based on eighth indication information in the first configuration information; or when all Scells in the first cell group are in the first state, the first cell can be configured to be in or enter the first state.

Those skilled in the art should understand that the relevant description of the foregoing cell state management apparatus in the embodiments of the present disclosure can be understood with reference to the relevant description of the cell state management method in the embodiments of the present disclosure.

Figure 8:
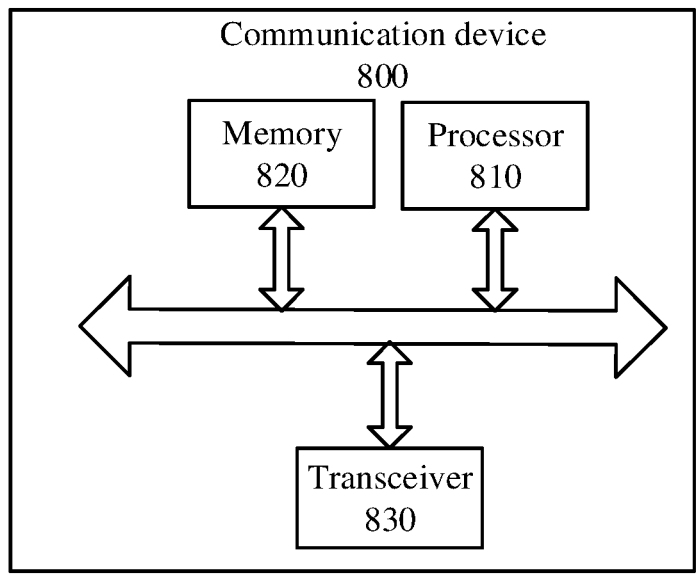
FIG. 8 is a schematic structural diagram of a communication device according to an embodiment of the present disclosure.

FIG. 8 is a schematic structural diagram of a communication device 800 according to an embodiment of the present disclosure. The communication device can be a terminal device or a network device. The communication device 800 shown in FIG. 8 includes a processor 810 which can invoke and execute a computer program from a memory to carry out the methods in the embodiments of the present disclosure.

Optionally, as shown in FIG. 8, the communication device 800 can further include a memory 820. The processor 810 can call and run the computer program from the memory 820 to carry out the methods in the embodiments of the present disclosure.

The memory 820 can be a separate device independent of the processor 810, or can be integrated in the processor 810.

Optionally, as shown in FIG. 8, the communication device 800 can further include a transceiver 830, and the processor 810 can control the transceiver 830 to communicate with other devices, and specifically to transmit information or data to other devices, or receive information or data transmitted from other devices.

The transceiver 830 can include a transmitter and a receiver. The transceiver 830 can further include an antenna, and the number of the antennas can be one or more.

Optionally, the communication device 800 can specifically be a network device in the embodiments of the present disclosure, and the communication device 800 can carry out the corresponding processes which are implemented by the network device in the methods of the embodiments of the present disclosure, which will not be repeated here for the sake of brevity.

Optionally, the communication device 800 can specifically be a mobile terminal/terminal device in the embodiments of the disclosure, and the communication device 800 can implement the corresponding processes which are implemented by the mobile terminal/terminal device in the methods according to the embodiments of the present disclosure, which will not be repeated here for the sake of brevity.

Figure 9:
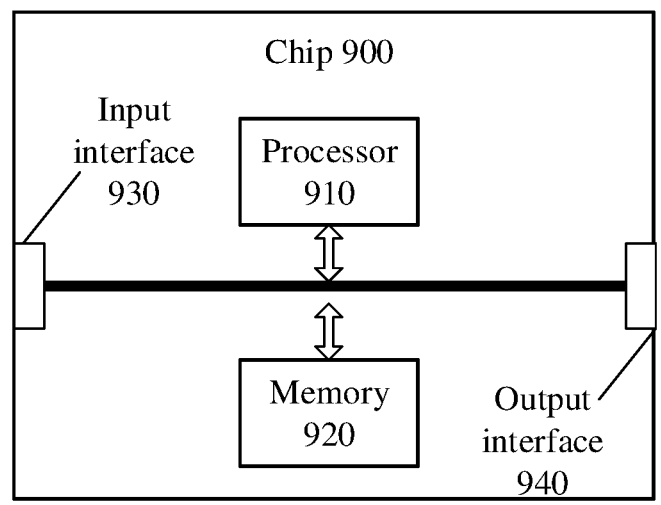
FIG. 9 is a schematic structural diagram of a chip according to an embodiment of the present disclosure.

FIG. 9 is a schematic structural diagram of a chip according to an embodiment of the present disclosure. The chip 900 shown in FIG. 9 includes a processor 910 which can invoke and run a computer program from a memory to implement the methods in the embodiments of the present disclosure.

Optionally, as shown in FIG. 9, the chip 900 can further include a memory 920. The processor 910 can invoke and run the computer program from the memory 920 to implement the methods in the embodiments of the present disclosure.

The memory 920 can be a separate device independent of the processor 910, or can be integrated in the processor 910.

Optionally, the chip 900 can further include an input interface 930. The processor 910 can control the input interface 930 to communicate with other devices or chips, and particularly to obtain information or data transmitted by other devices or chips.

Optionally, the chip 900 can further include an output interface 940. The processor 910 can control the output interface 940 to communicate with other devices or chips, and particularly to output information or data to other devices or chips.

Optionally, the chip can be applied to the network device in the embodiments of the present disclosure, and the chip can carry out the corresponding processes which are implemented by the network device in the methods of the embodiments of the present disclosure, which will not be repeated here for the sake of brevity.

Optionally, the chip can be applied to the mobile terminal/terminal device in the embodiments of the present disclosure, and the chip can implement the corresponding processes which are implemented by the mobile terminal/terminal device in the methods of the embodiments of the present disclosure, which will not be repeated here for the sake of brevity.

It should be understood that the chip mentioned in the embodiments of the present disclosure can also be referred to as a system-level chip, a system chip, a chip system, or a system-on-chip.

Figure 10:
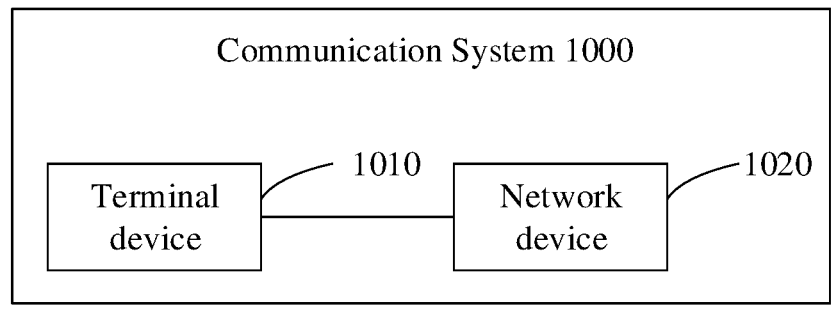
FIG. 10 is a schematic block diagram of a communication system according to an embodiment of the present disclosure.

FIG. 10 is a schematic block diagram of a communication system 1000 according to an embodiment of the present disclosure. As shown in FIG. 10, the communication system 1000 includes a terminal device 1010 and a network device 1020.

The terminal device 1010 can be used to implement the corresponding functions implemented by the terminal device in the above methods, and the network device 1020 can be used to implement the corresponding functions implemented by the network device in the above methods, which will not be repeated here for the sake of brevity.

It should be understood that the processor according to the embodiments of the present disclosure can be an integrated circuit chip with signal processing capability. In the implementations, the steps of the foregoing method embodiments can be performed by an integrated logic circuit of hardware in the processor or by instructions in a form of software. The foregoing processor can be a general-purpose processor, a Digital Signal Processor (DSP), an Application Specific Integrated Circuit (ASIC), a Field Programmable Gate Array (FPGA), other programmable logic devices, discrete gate or transistor logic device, or a discrete hardware component, which can implement the methods, steps, and logical blocks disclosed in the embodiments of the present disclosure. The general-purpose processor can be a microprocessor, any conventional processor or the like. The steps of the methods disclosed in connection with the embodiments of the present disclosure can be directly embodied in and performed by a hardware decoding processor, or can be implemented by a combination of hardware and software modules in the decoding processor. The software modules can be located in a mature storage medium in the art such as a random access memory, a flash memory, a read-only memory, a programmable read-only memory, an electrically erasable programmable memory or a register. The storage medium is located in the memory, and the processor reads information in the memory and implements the steps of the above methods in combination with the hardware thereof.

It can be understood that the memory in the embodiments of the present disclosure may be a volatile memory or a non-volatile memory, or may include both the volatile and non-volatile memories. The non-volatile memory can be a Read-Only Memory (ROM), a Programmable ROM (PROM), an erasable PROM (EPROM), an electrically EPROM (EEPROM) or a flash memory. The volatile memory may be a Random Access Memory (RAM), which is used as an external cache. By way of exemplary but not restrictive description, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ES-DRAM), a Synchlink DRAM (SLDRAM)) and a Direct Rambus RAM (DR RAM). It should be noted that the memories of the systems and methods described herein are intended to include, but are not limited to, these and any other suitable types of memories.

It should be understood that the foregoing description of the memory is exemplary rather than limiting. For example, the memory in the embodiments of the present disclosure can also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch-Link DRAM (SLDRAM), a Direct Rambus RAM (DR RAM), among others. That is to say, the memory in the embodiments of the present disclosure is intended to include but is not limited to those and any other suitable types of memories.

The embodiments of the present disclosure also provide a computer-readable storage medium for storing a computer program.

Optionally, the computer-readable storage medium can be applied to the network device in the embodiments of the present disclosure, and the computer program causes a computer to perform the corresponding processes which are implemented by the network device in the methods of the embodiments of the present disclosure, which will not be repeated here for the sake of brevity.

Optionally, the computer-readable storage medium can be applied to the mobile terminal/terminal device in the embodiments of the present disclosure, and the computer program causes a computer to perform the corresponding processes which are implemented by the mobile terminal/terminal device in the methods of the embodiments of the present disclosure, which will not be repeated here for the sake of brevity.

The embodiments of the present disclosure also provide a computer program product including computer program instructions.

Optionally, the computer program product can be applied to the network device in the embodiments of the present disclosure, and the computer program instructions cause a computer to perform the corresponding processes implemented by the network device in the methods according to the embodiments of the present disclosure, which will not be repeated here for the sake of brevity.

Optionally, the computer program product can be applied to the mobile terminal/terminal device in the embodiments of the present disclosure, and the computer program instructions cause a computer to perform the corresponding processes which are implemented by the mobile terminal/ terminal device in the methods of the embodiments of the present disclosure, which will not be repeated here for the sake of brevity.

The embodiments of the disclosure also provide a computer program.

Optionally, the computer program can be applied to the network device in the embodiments of the present disclosure, and when running on a computer, the computer program causes the computer to perform the corresponding process implemented by the network device in the methods according to the embodiments of the present disclosure, which will not be repeated here for the sake of brevity.

Optionally, the computer program can be applied to the mobile terminal/terminal device in the embodiments of the present disclosure, and when running on a computer, the computer program causes the computer to perform the corresponding processes implemented by the mobile terminal/terminal device in the methods of the embodiments of the present disclosure, which will not be repeated here for the sake of brevity.

Those of ordinary skill in the art can recognize that the exemplary units and algorithm steps described in connection with the embodiments disclosed herein can be implemented in electronic hardware or a combination of computer software and the electronic hardware. Whether these functions are implemented in hardware or in software depends on the specific applications of the technical solutions and design constraints. Various methods can be used by professional technicians to implement the described functions for each specific application, and such implementations should not be considered as going beyond the scope of the present disclosure.

Those skilled in the art can clearly understand that for convenience and conciseness of the description, for the specific operating process of the systems, devices and units described above, reference can be made to corresponding processes in the foregoing method embodiments, which will not be repeated here.

It should be understood that the systems, devices, and methods disclosed in several embodiments of the present disclosure can be implemented in other manners. For example, the device embodiments described above are merely illustrative. For example, the division of the units is only a logical function division, and in actual implementations, there can be other division manners. For example, a plurality of units or components can be combined or integrated into another system, or some features can be ignored or not implemented. In addition, the coupling or direct coupling or communication connection shown or discussed herein can also be indirect coupling or communication connection through some interfaces, devices or units, and can be in electrical, mechanical or other forms.

The units described as separate components may be or may not be physically separated, and the components shown as units may be or may not be physical units, that is, they may be located in one place or may be distributed on multiple network units. Some or all of the units can be selected to achieve the objectives of the solutions of the embodiments according to actual requirements.

In addition, the functional units in the embodiments of the present disclosure can be integrated into one processing unit, or each unit can individually exist physically, or two or more of the units can be integrated into one unit.

If implemented in the form of software functional units and sold or used as an independent product, the functions can be stored in a computer-readable storage medium. Based on such understanding, the technical solution of the present disclosure essentially, a part thereof that contributes to the prior art, or a part of the technical solution can be embodied in the form of a software product, and the computer software product is stored in a storage medium and includes instructions which enable a computer device (which may be a personal computer, a server, a network device or the like) to perform all or part of the steps of the methods described in the embodiments of the present disclosure. The foregoing storage medium includes various medium such as a USB drive, a removable hard disk, a ROM, a RAM, a magnetic disk or an optical disc that can store program codes.

Those described above are only specific implementations of the present disclosure, and the protection scope of the present disclosure is not limited thereto. Any alteration or replacement readily devised by a person skilled in the art within the technical scope disclosed in the present disclosure shall fall within the scope of the present disclosure. Therefore, the protection scope of the present disclosure shall be subject to the protection scope of the claims.

What is claimed is:

1. A method for cell state management, comprising:
   receiving, by a terminal device, first configuration information sent by a network device, the first configuration information being used to indicate whether a state of a first cell is a first state or a second state, wherein the first state represents an active state with a dormancy behavior, and the second state represents an active state with a non-dormancy behavior,
   wherein the first configuration information comprises uplink bandwidth part (BWP) configuration information and downlink BWP configuration information, the uplink BWP configuration information comprises at least one uplink BWP configuration, and the downlink BWP configuration information comprises at least one downlink BWP configuration, and
   wherein the uplink BWP configuration information carries first indication information, and the first indication information is used to indicate a BWP identification corresponding to an uplink initial activated BWP, the downlink BWP configuration information carries second indication information, and the second indication information is used to indicate the BWP identification corresponding to a downlink initial activated BWP, and the initial activated BWP represents a BWP that is first activated.

2. The method according to claim 1, wherein at least one of the uplink BWP configuration information further carries third indication information, or the downlink BWP configuration information carries fourth indication information,
   wherein the third indication information is used to indicate a BWP identification corresponding to an uplink dormant BWP, and the fourth indication information is used to indicate a BWP identification corresponding to a downlink dormant BWP.

3. The method according to claim 1, wherein the first configuration information carries fifth indication information, and the fifth indication information is used to indicate that the state of the first cell is the active state,
   when the BWP identification indicated by at least one of the first indication information or the second indication information is the same as a BWP identification of the dormant BWP, an initial state of the first cell is the first state, and
   when the BWP identification indicated by at least one of the first indication information or the second indication information is different from the BWP identification of the dormant BWP, the initial state of the first cell is the second state.

4. The method according to claim 1, wherein the first configuration information is carried in Radio Resource Control (RRC) signaling.

5. The method according to claim 1, further comprising:
switching, by the terminal device after receiving first control signaling sent by the network device, from a current BWP to a first BWP, wherein the first control signaling is used to instruct the terminal device to enter the second state from the first state.

6. The method according to claim 5, wherein the first BWP is at least one of an uplink initial activated BWP or a downlink initial activated BWP that is configured in the first configuration information.

7. The method according to claim 5, wherein the first BWP is at least one of an uplink BWP or a downlink BWP that last serves before the terminal device enters the first state.

8. The method according to claim 5, wherein the first control signaling is Downlink Control Information (DCI).

9. The method according to claim 1, further comprising:
entering, by the terminal device after receiving second control signaling sent by the network device, an inactive state from the first state or the second state,
wherein the second control signaling is used to instruct the terminal device to enter the inactive state from the active state, to enter the inactive state from the first state, or to enter the inactive state from the second state.

10. The method according to claim 9, wherein the second control signaling is a Media Access Control Control Element (MAC CE).

11. A method for cell state management, comprising:
sending, by a network device, first configuration information to a terminal device, the first configuration information being used to indicate whether a state of a first cell is a first state or a second state, wherein the first state represents an active state with a dormancy behavior, and the second state represents an active state with a non-dormancy behavior,
wherein the first configuration information comprises uplink BWP configuration information and downlink BWP configuration information, the uplink BWP configuration information comprises at least one uplink BWP configuration, and the downlink BWP configuration information comprises at least one downlink BWP configuration, and
wherein the uplink BWP configuration information carries first indication information, and the first indication information is used to indicate a BWP identification corresponding to an uplink initial activated BWP; the downlink BWP configuration information carries second indication information, and the second indication information is used to indicate the BWP identification corresponding to a downlink initial activated BWP; and the initial activated BWP represents a BWP that is first activated.

12. The method according to claim 11, wherein at least one of the uplink BWP configuration information further carries third indication information, or the downlink BWP configuration information carries fourth indication information,
wherein the third indication information is used to indicate a BWP identification corresponding to an uplink dormant BWP, and the fourth indication information is used to indicate a BWP identification corresponding to a downlink dormant BWP.

13. The method according to claim 11, wherein the first configuration information carries fifth indication information, and the fifth indication information is used to indicate that the state of the first cell is the active state,
when the BWP identification indicated by at least one of the first indication information or the second indication information is the same as a BWP identification of the dormant BWP, an initial state of the first cell is the first state, and
when the BWP identification indicated by at least one of the first indication information or the second indication information is different from the BWP identification of the dormant BWP, the initial state of the first cell is the second state.

14. The method according to claim 11, wherein the first configuration information is carried in Radio Resource Control (RRC) signaling.

15. The method according to claim 11, further comprising:
sending, by the network device, third control signaling to the terminal device to trigger the terminal device to enter a target state from an inactive state, wherein the target state is determined based on seventh indication information in the first configuration information, and the seventh indication information is used to indicate that an initial state of the first cell when the first cell enters the active state is the first state or the second state,
wherein the third control signaling is used to instruct the terminal device to enter the active state from the inactive state, to enter the first state from the inactive state, or to enter the second state from the inactive state.

16. The method according to claim 15, wherein the third control signaling is a Media Access Control Control Element (MAC CE).

17. The method according to claim 11, wherein the first cell is a Secondary Cell (Scell).

18. A terminal device, comprising:
a processor;
a memory; and
a transceiver configured to receive first configuration information sent by a network device, the first configuration information being used to indicate whether a state of a first cell is a first state or a second state,
wherein the first state represents an active state with a dormancy behavior, and the second state represents an active state with a non-dormancy behavior,
wherein the first configuration information comprises uplink bandwidth part (BWP) configuration information and downlink BWP configuration information, the uplink BWP configuration information comprises at least one uplink BWP configuration, and the downlink BWP configuration information comprises at least one downlink BWP configuration, and
wherein the uplink BWP configuration information carries first indication information, and the first indication information is used to indicate a BWP identification corresponding to an uplink initial activated BWP; the downlink BWP configuration information carries second indication information, and the second indication information is used to indicate the BWP identification corresponding to a downlink initial activated BWP; and the initial activated BWP represents a BWP that is first activated.

\* \* \* \* \*